Aug. 21, 1962 W. J. UEBELACKER 3,050,314
CHUCK
Filed Jan. 3, 1961

*INVENTOR.*
WILLIAM J. UEBELACKER
BY Frank C. Parker
*ATTORNEY*

United States Patent Office 3,050,314
Patented Aug. 21, 1962

3,050,314
CHUCK
William J. Uebelacker, Rochester, N.Y., assignor to Bausch & Lomb Incorporated, Rochester, N.Y., a corporation of New York
Filed Jan. 3, 1961, Ser. No. 80,411
5 Claims. (Cl. 279—46)

The present invention relates generally to chucks and is more particularly concerned with a chuck suitable for mounting a lens blocking body.

In the lens grinding and polishing art, it is conventional practice to mount the lenses on a blocking body, the latter being mounted in a suitable chucking mechanism. The lens blocking body is then rotated so that the lenses carried thereby are disposed against a grinding or polishing tool. Usually an abrasive liquid or slurry is flowed over the blocking body throughout the entire grinding or polishing operation. Conventionally, such a slurry tends to dry out in time and to cause the chuck operating parts to become locked together so that it is very difficult to separate the parts.

The present invention has for a particular object the provision of an improved chuck which is substantially sealed in order to prevent the grinding or polishing slurry from reaching the operating parts of the chuck. As a result, the chuck is more easily maintained in operative condition and such chucks have been found to function far more satisfactorily than those conventionally utilized for rotatably mounting a lens blocking body.

With the foregoing general objects in mind, the invention, as well as its advantages, will be more thoroughly understood from the following detailed description when read in conjunction with the accompanying drawing, wherein.

Figure 1:
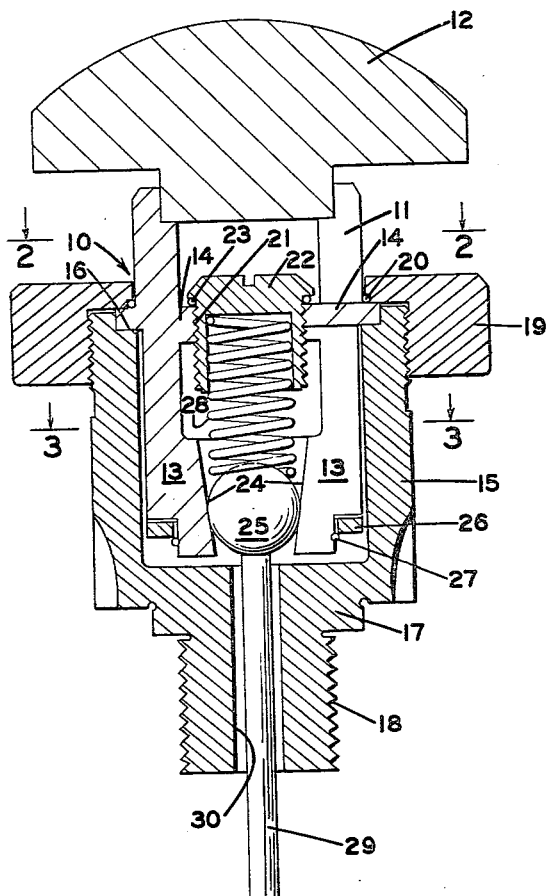
FIG. 1 is a side elevational view, shown mostly in section, illustrating the chuck comprising the subject matter of the present invention.
Figure 2:
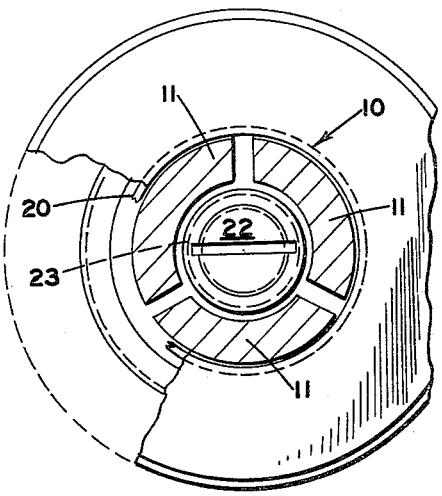
FIG. 2 is a sectional view, taken substantially along the line 2—2 in FIG. 1 and looking in the direction of the arrows.
Figure 3:
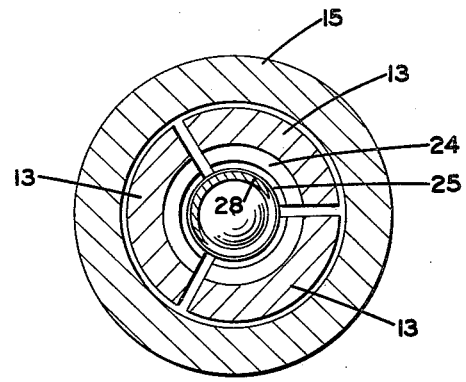
FIG. 3 is a sectional view, taken substantially along the line 3—3 in FIG. 1 and looking in the direction of the arrows.

With reference now to the drawing, wherein like reference numerals have been used in the different views to identify identical parts, the chuck comprising the subject matter of the present invention comprises a split sleeve 10 having three jaws 11 for holding a lens blocking body 12 and three actuating portions 13 connected to the jaws 11 by means of an integral web portion 14. The split sleeve actuating portions 13 are received within a cylindrical mounting member 15 which is open at its upper end, being formed with an annular shoulder 16, and which is substantially closed at its lower end, as indicated at 17, and further being formed with an axially extending splined driving flange 18.

By means of the splined driving flange 18, the chuck 10 is rotated. The web portion 14 being slightly flexible is adapted to be received against shoulder 16 and held thereon by means of a nut 19 which is threaded onto the upper end of the mounting member 15. A suitable annular sealing ring 20 is disposed between the nut 19 and the upper surface of the web 14 in order to effect a seal therebetween.

The web portion 14 is formed with a central threaded opening 21 within which a hollow screw 22 is threaded. An annular sealing ring 23 disposed around the screw head is adapted to be compressed against the upper surface of the web portion 14 to effect a seal therebetween.

The lower ends of the actuating portions 13 of the chuck 10 are each formed with an internal conically shaped surface 24 with which an actuating ball 25 cooperates. A retaining washer 26 is disposed around the lower end of each of the actuating portions 13 and is held in place by a snap ring 27. The retaining washer limits the spreading of the portions 13. A strong compression spring 28 is operably disposed within the opening in the screw 22 and in abutment with the ball 25 so as to exert a force downwardly against the ball, this force tending to expand the actuating portions 13 and thereby contract the chuck jaws 11 toward the mounting hub of the lens blocking body 12.

When it is desired to remove the lens blocking body from the jaws 11 of the chuck 10, a suitable rod 29 may be received within an axially extending opening 30 in the lower end of the mounting member 15 in order to push the ball 25 relatively upwardly out of camming engagement with the conically shaped surfaces 24. This enables the depending actuating portions 13 to collapse slightly so that the chuck jaws 11 may release their grip upon the lens blocking body hub.

It will be understood that in normal operation, the chuck is mounted in a near vertical position. The lens blocking body 12 is disposed so as to contact a grinding or polishing tool (not shown). A liquid abrasive slurry is continuously flowed over the blocking body 12 and runs down onto the chuck 10. The sealing rings 20 and 23 are effective to maintain a substantial seal across the top portion of the chuck which has been found to be particularly effective in preventing the abrasive slurry from entering the chuck proper.

It is contemplated that numerous changes and modifications may be made in the present invention without departing from the spirit or scope thereof.

What is claimed is:

1. A chuck comprising a split sleeve defining a plurality of substantially equi-angularly spaced members interconnected by an integral flexible web portion disposed generally medially of said spaced members, said spaced members defining cooperable jaws at one end for holding an object therebetween, said spaced members defining facing internal cam surfaces at the other end, and a spring urged wedging member disposed between and cooperable with said cam surfaces for biasing the other end of said spaced members apart and thereby effecting pivotal movement of the spaced members about said web portion as a fulcrum so as to in turn force said cooperable jaws toward one another.

2. A chuck comprising a split sleeve defining a plurality of angularly spaced members interconnected by an integral flexible web portion disposed generally medially of said spaced members, said spaced members defining cooperable jaws at one end for holding an object therebetween, said spaced members defining internally facing conically shaped surfaces at the other end, a ball disposed between and cooperable with said conically shaped surfaces, and a spring acting against said ball for effectively biasing the other end of said spaced members apart so as to effect pivotal movement of the spaced members about said web portion as a fulcrum to thereby urge said cooperable jaws toward one another.

3. A chuck comprising a split sleeve defining a plurality of angularly spaced members interconnected by an integral web portion disposed generally medially of said spaced members, said spaced members defining cooperable jaws at one end for holding an object therebetween, said spaced members defining internally facing conically shaped members at the other end, a ball disposed between and cooperable with said conically shaped surfaces, said web being formed with a central threaded opening therein, a hollow screw threaded into said web opening, and a compression spring disposed within said hollow screw and in abutment with said ball for biasing said other end of the spaced members apart about said web portion as a fulcrum so as to thereby urge said cooperable jaws toward one another.

4. A chuck for mounting a lens blocking body for rotation in a lens grinder, said chuck comprising a split sleeve defining a plurality of angularly spaced members interconnected by an integral web portion disposed generally medially of said spaced members, a cylindrical mounting member substantially closed at one end for receiving said split sleeve therein with the web portion thereof seated within an annular seat formed in the other end of the mounting member, a closure member for sealingly engaging said web portion and threaded onto said other end of the mounting member for preventing foreign matter from entering the chuck, said spaced members defining cooperable jaws at the outer end thereof for holding the lens blocking body therein, said spaced members defining internally facing conically shaped members at the inner end, a ball disposed between and cooperable with said conically shaped surfaces, and a spring acting against said ball for biasing the inner ends of said spaced members apart to thereby effect pivotal movement of the spaced members about said web portion as a fulcrum so as to urge said cooperable jaws toward one another.

5. A chuck for mounting a lens blocking body for rotation in a lens grinder, said chuck comprising a split sleeve defining a plurality of angularly spaced members interconnected by an integral web portion disposed generally medially of said spaced members, a cylindrical mounting member substantially closed at one end for receiving said split sleeve therein with the web portion thereof seated within an annular seat formed in the other end of the mounting member, a closure member for sealingly engaging said web portion and threaded onto said other end of the mounting member for preventing foreign matter from entering the chuck, said spaced members defining cooperable jaws at the outer end for holding an object therebetween, said spaced members defining facing conically shaped surfaces at the inner end, a ball disposed between said conically shaped surfaces and cooperable therewith, said web being formed with a central threaded opening therein, a hollow screw threaded into said web opening, and a compression spring disposed within said hollow screw and in abutment with said ball for biasing the inner ends of the spaced members apart about said web portion as a fulcrum so as to thereby urge said cooperable jaws toward one another.

References Cited in the file of this patent

UNITED STATES PATENTS

| | | | |
|---|---|---|---|
| 2,389,366 | Jones | | Nov. 20, 1945 |
| 2,460,414 | Fuller | | Feb. 1, 1949 |
| 2,481,094 | Edwards | | Sept. 6, 1949 |
| 2,538,289 | Arms | | Jan. 16, 1951 |